United States Patent [19]

Mills

[11] Patent Number: 5,293,710
[45] Date of Patent: Mar. 15, 1994

[54] FISHING POLE STRIKE INDICATOR

[76] Inventor: Joseph P. Mills, 311 Southern Ave., Selah, Wash. 98942

[21] Appl. No.: 959,445

[22] Filed: Oct. 13, 1992

[51] Int. Cl.$^5$ ............................................. A01K 97/12
[52] U.S. Cl. .......................................................... 43/17
[58] Field of Search ....................................... 43/17, 25

[56] References Cited

U.S. PATENT DOCUMENTS

| | | | |
|---|---|---|---|
| 2,166,657 | 7/1939 | Evelyn | 240/10.61 |
| 2,302,337 | 11/1942 | Mantell | 43/16 |
| 2,574,333 | 11/1951 | Kuczynski | 43/17 |
| 2,745,088 | 5/1956 | Bauer | 43/17 |
| 2,901,855 | 9/1959 | Todd | 43/17 |
| 2,948,076 | 8/1960 | Patricello | 43/17 |
| 3,024,561 | 3/1962 | Wyatt | 43/17 |
| 3,188,767 | 6/1965 | Finefield | 43/17 |
| 3,440,754 | 4/1969 | Slama | 43/17 |
| 3,453,767 | 7/1969 | Lake et al. | 43/17 |
| 3,571,536 | 3/1971 | Sparks | 43/17 |
| 3,624,689 | 11/1971 | Rizzo | 43/17 |
| 3,696,546 | 10/1972 | Ambrose | 43/17 |
| 3,740,887 | 6/1973 | Van Leeuwen | 43/17.5 |
| 3,881,270 | 5/1975 | Olcott | 43/17 |
| 4,240,221 | 12/1980 | Komarnicki | 43/17 |
| 4,471,555 | 9/1984 | Soukup | 43/17 |
| 4,479,321 | 10/1984 | Welstead | 43/17 |
| 4,505,063 | 3/1985 | Price et al. | 43/17 |
| 4,697,375 | 10/1987 | Mills | 43/17.5 |
| 4,905,398 | 3/1990 | Botbyl | 43/17 |

Primary Examiner—Kurt C. Rowan
Attorney, Agent, or Firm—Seed and Berry

[57] ABSTRACT

A strike indicator for use on a fishing pole and having an elongated probe, a ring circumscribing one end of the probe, a circuit having a light and battery for energizing the light when the probe contacts the ring, and clamps for adjustably mounting the probe, circuit and ring along the length of the fishing pole. The probe is mounted on a spring. The ring may be pivoted.

12 Claims, 4 Drawing Sheets

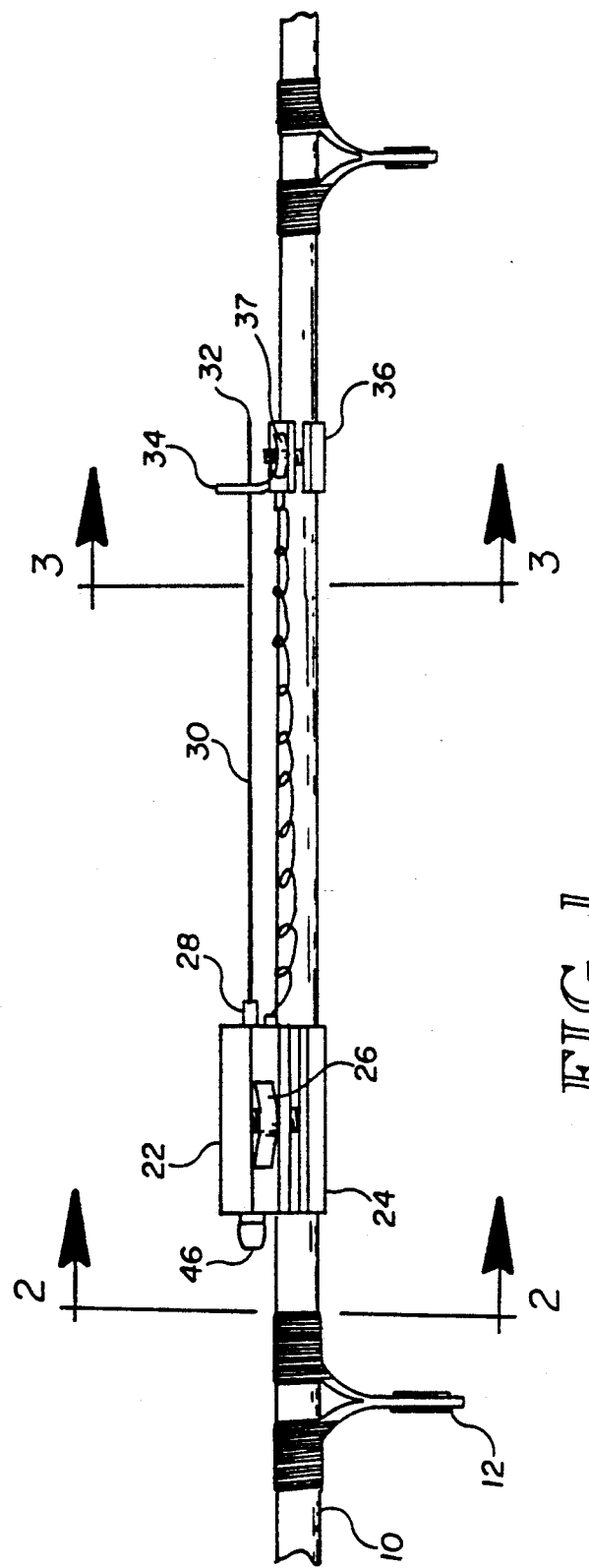

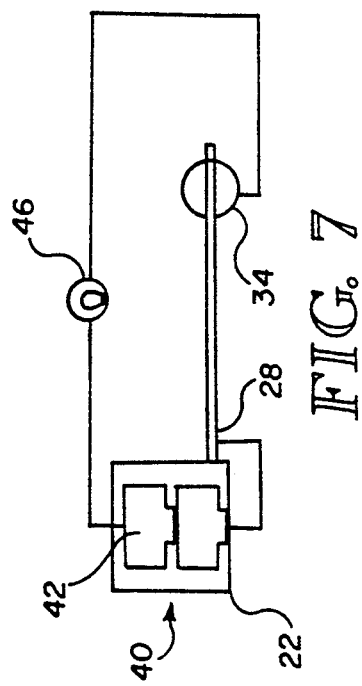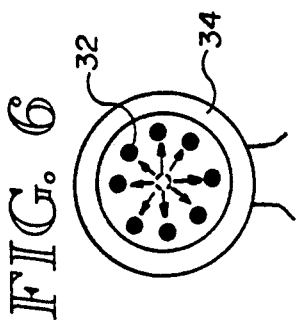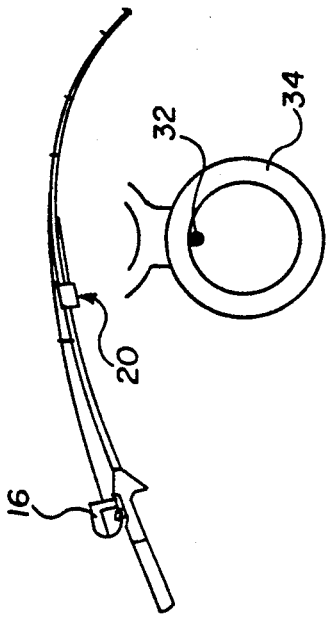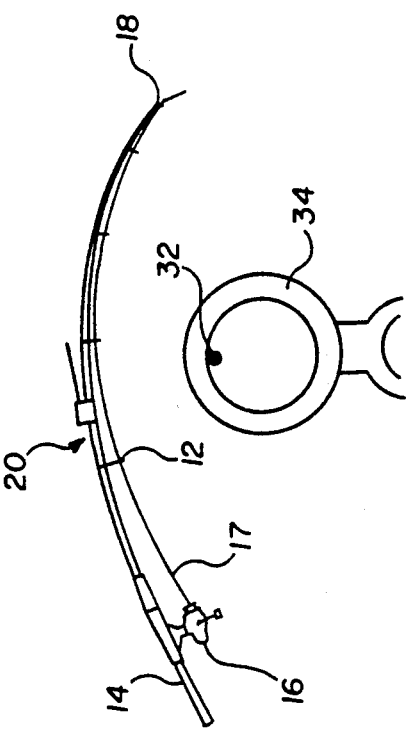

FISHING POLE STRIKE INDICATOR

DESCRIPTION

1. Technical Field

This invention pertains to devices to be attached to a flexible fishing pole for determining when the flex exceeds a predetermined set amount to signal various indications or conditions of the lure being held by the fishing pole.

2. Background of the Invention

Various apparatus have been developed for informing the fisherman when a fish has struck the lure. When a fish strikes the lure, there is a constant pull on the fishing line, causing the pole to flex under the tension in the line. This pull can be felt by a fisherman with sensitivity in his hands or otherwise observed only from long experience.

Various types of visual indicators have been developed to assist the fisherman to determine when a strike has occurred. For example, U.S. Pat. No. 3,696,546 shows a stiff probe forming an electrical circuit with a remote contact. When the pole is bent, the probe engages the contact to close a circuit and energize a light that is visible to the fisherman. A difficulty with this type of system, however, is that the bend capability being sensed by the device is only in a single plane. Thus, if the pole becomes rotated so that the bend occurs out of the plane, the contact will not be closed, failing to give a proper signal when a strike occurs. U.S. Pat. No. 4,476, shows a gravity-activated switch. This device monitors gravity pull rather than the flex of the pole. Thus the switch will not be properly activated if the pole is tilted at any particular initial given angle caused by the listing of a boat and will give false triggering signals.

SUMMARY OF THE INVENTION

It is an object of this invention to provide a strike-triggering device that can be easily fitted onto a pole and will give strike indications regardless of which position the pole is held in any of 360° positions of rotation.

It is another object of the invention to provide a fish strike-triggering device which can be adjusted to accommodate poles of different thickness and thus different flexures. Furthermore, the device can be adjusted to signal any type of rhythmic normal motion of the pole such as when a lure is being trolled through the water.

Basically these objects are best achieved by providing an elongated probe contact that is positioned at one location along the length of the pole, a circular contact which circumscribes the probe contact and is located at a second position along the length of the pole. The contacts are connected by an electrical circuit and a signaling indicator such as a light. By adjusting the distance between the base of the probe and the electrical contact, the gap between the contact and probe when the pole is bent can be varied to set the contact within the probe at a predetermined initial spacing. When bends occur in the pole in any direction beyond any initial bend, the gap between the probe contact and the circular contact is closed to energize the light. If desired, the gap between the probe contact and the circular contact can be set to intermittently close the circuit during the smaller bending motion which occurs from the lure action being trolled through the water. In such a case, then only excessive or abnormal bends will constantly hold the probe against the circular contact, keeping the light energized constantly to signal that a strike has occurred as opposed to merely signalling the lure action from the trolling motion.

BRIEF DESCRIPTION OF THE DRAWINGS

FIG. 1 is a side elevation showing the fishing pole striking indicator attached to a pole.

FIG. 4 is a fragmentary section corresponding to the position of the pole also shown in FIG. 4.

FIG. 5 is a fragmentary position of the probe in a circular ring contact, again with the position of the pole as shown also in FIG. 5.

FIG. 6 is a schematic illustration of the probe within the circular ring contact showing the various directions of operation.

FIG. 7 shows a schematic electrical circuit for the signaling indicator.

DETAILED DESCRIPTION OF THE INVENTION

Figure 3:
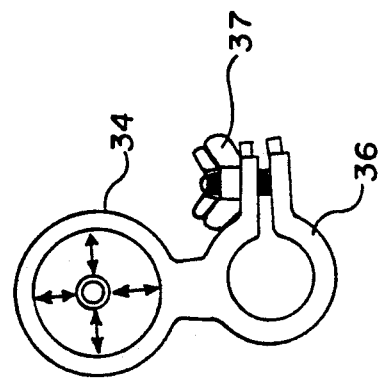
FIG. 3 is a section taken along lines 3—3 of FIG. 1.

As best shown in FIG. 1, a pole 10 includes the normal line guides 12, a handle end 14 (FIG. 4) with a reel 16 and a tip end 18. Line guides for fishing line 17 are spaced along the length of the pole, as shown in FIG. 4. As is well known, when the rod is trolling a lure through the water, the pole will have a natural bend such as shown in FIG. 4. As is also well known, if a strike occurs the pull on the line increases, causing the pole to bend an additional amount. This pull tends to be sustained or constant at least for a brief period sufficient for an alert fisherman to notice the light being energized.

Figure 2:
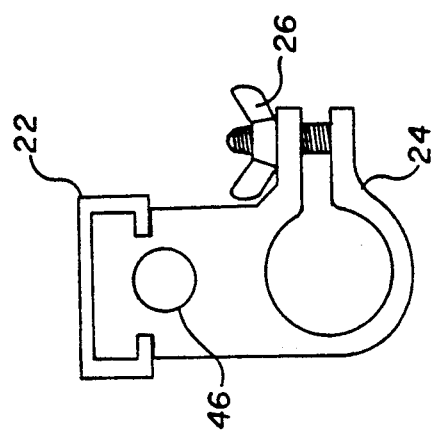
FIG. 2 is a section taken along lines 2—2 of FIG. 1.

The fishing pole strike indicator 20 is best shown in FIGS. 1 and the section views FIGS. 2 and 3 and includes a battery housing 22 for holding one or more conventional batteries. A pole clamp 24 is locked onto the pole by wing nut and bolt 26. It should be understood that the clamp 24 can be opened sufficient to allow the pole to slide in when the wing nut and bolt are removed so that the clamp can be placed on the pole at essentially any location along its length.

Attached to the housing 22 is the base end of a probe contact 30. The base end is in the form of a small coil spring 28. The purpose of the spring is to allow the probe to remain straight and the spring to bend when a fish strikes. This will keep the probe in contact with the ring contact while the fish bends the pole. Also because of the spring as the pole bends, there is no excessive pressure on the probe. The free end 32 of the probe contact is fitted within a ring contact 34 that is attached to the pole by a second pole clamp 36 with additional wing nut and bolt 37.

One end of the probe contact 30 is connected to an electrical circuit 40, best shown in FIG. 7. As best shown in FIG. 7, batteries 42 in the battery housing 22 have the negative connected to the base 28 of the probe contact 30 and the tip 32 of the contact is positioned within the circular contact 34. The circular contact is then connected to the light or other signaling device 46 with the other side of the light connecting to the positive side of the battery. As is readily apparent, when the probe contact is deflected to contact the ring contact, the circuit is closed and the light is energized.

By adjusting the position of the circular contact 34 closer or farther from the battery housing and base of the probe contact, the amount of bend in the pole necessary to engage the probe contact against the circular contact can be adjusted. This is useful for providing a preset gap when the pole has an initial bend caused from trolling the lure through the water. It is also useful for adjusting the gap to allow pulsating intermittent contact between the probe contact and the circular contact to show a rhythmic energizing of the light, thus showing that the lure is moving properly through the water.

FIG. 4 shows a typical example where the pole is set in a pole mount such that the reel is on the lower surface of the pole and the strike indicator mechanism 20 is on the upper surface of the pole.

FIG. 5 shows the condition in which the reel 16 is on the upper side of the pole and the strike indicator is on the bottom side of the pole. In both conditions, the strike indicator mechanism 20 is located on the side of the pole opposite the line guides and fishing line so that it does not interfere with movement of the line through the guides.

In operation the strike indicator is mounted to the pole at preferably the central region of the pole by sliding the clamps over the pole and then tightening the clamps onto the pole with bolts and thumbscrews. The circular contact 34 is then adjusted toward or away from the battery housing to obtain the desired predetermined gap between the probe contact 30 and the ring contact 34 as the pole is in its natural bend position under the influence of the trolling action of the lure. The gap is then set at a minimum to bring the two contacts into engagement with one another when a strike occurs.

Figure 8:
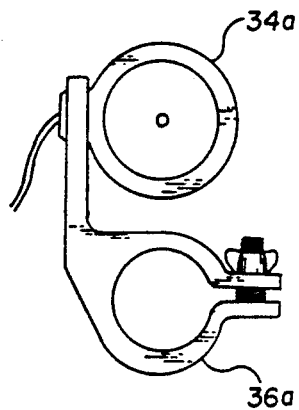
FIG. 8 is a side elevational view of a ring contact looking to the right in FIG. 10.
Figure 9:
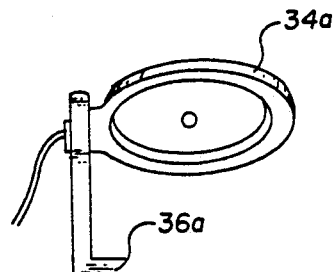
FIG. 9 is a fragmentary view of the ring contact in a partially rotated position.
Figure 10:
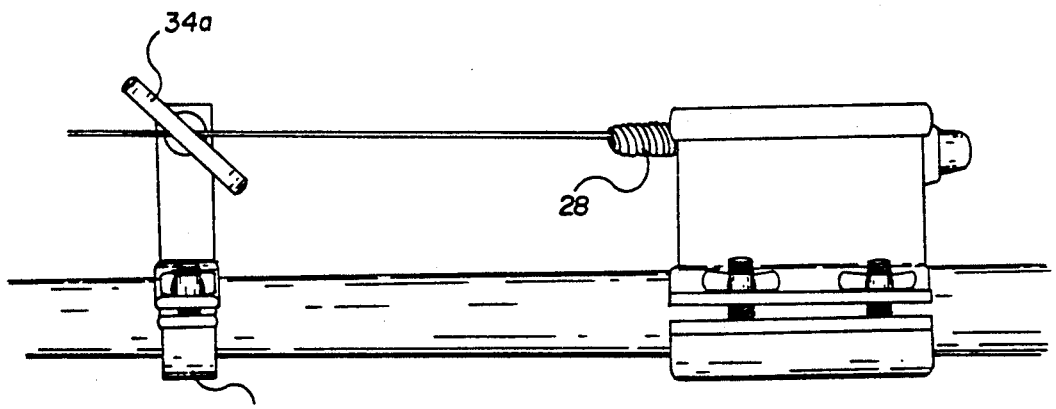
FIG. 10 is a fragmentary front elevation of the invention.

As best shown in FIGS. 8-10, the ring contact 34a can pivot about its connection point on clamp 36a. When used on a spinning pole with line guides down or the casting line guide up, the ring contact can be adjusted to detect slight movements in the downward direction. By rotating the conductive ring 36a, the distance between the top and bottom of the conductive ring becomes closer to the probe, but the side to side spacing in the ring stays approximately the same. With this adjustment, the slightest flex on the pole downward will cause it to signal, but a breeze that would cause the pole to flex side to side will not cause a signal because the probe will stay in the elongated part of the conductive ring contact.

While the preferred embodiments of the invention have been illustrated and described, it should be understood that variations will occur without departing from the principles herein. Accordingly, the invention is not to be limited to the embodiment shown in the drawings.

I claim:

1. A fishing pole strike indicator comprising:
   a source of electrical power;
   an elongated probe contact having first and second ends;
   an electrical ring contact circumscribing the second end of said probe contact and engageable with the probe contact by lateral movement of the ring contact in any direction;
   a signaling device;
   circuit means for connecting a first end of said probe contact, said signaling device and said ring contact to said power source, whereby relative lateral movement of said ring contact and second end of said probe contact in any direction over a predetermined distance will close the circuit to energize the signaling device; and
   means for connecting the probe contact and ring contact along the length of a flexible fishing pole.

2. The strike indicator of claim 1 wherein said signaling device is a light.

3. The strike indicator of claim 1 wherein said connecting means includes a first clamp for adjustably mounting the first end of the probe contact to the fishing pole, and a second clamp for adjustably mounting the ring contact to the fishing pole at a distance remote from the first end of the probe contact.

4. The strike indicator of claim 3, said fishing pole having a handle end and a tip end, the first clamp adapted to attach the first end of the probe contact closer to the handle end than to the tip end, the second clamp adapted to attach the ring contact closer to the tip end of the pole than the handle end.

5. The strike indicator of claim 1, said fishing pole having a handle end and a tip end, said means for connecting the probe contact and ring contact along the length of the pole including clamp means for connecting the ring contact closer to the tip end of the pole than the first end of the probe contact.

6. The strike indicator of claim 4, said first and second clamps each including a C-shaped clamp having a set of fastening ears, and bolt means for compressing said ears together to tighten the clamp on the fishing pole.

7. The strike indicator of claim 1, in which the probe contact is mounted to the pole by a coil spring.

8. The strike indicator of claim 1, in which the ring contact is planar and is pivotally coupled to the pole for rotating about an axis through the plane of the ring contact.

9. A strike indicator for use on a fishing pole comprising:
   circuit means having an elongated flexible probe having a fixed end connected to the pole and a remote free end lying parallel to and overlying a portion of the pole, a power supply, a signaling device, and a circular ring circumscribing the free end of the probe and movable with flexing of the pole to engage the probe, said circuit being activated to energize the signaling device when flexing of the pole causes the circular ring and free end of the probe to move into contact with one another in any 360 degree direction of movement.

10. The strike indicator of claim 9, including means adapted to mount the circuit means along the length of a fishing pole.

11. The strike indicator of claim 9, in which the probe is mounted to the pole by a coil spring.

12. The strike indicator of claim 9, in which the ring contact is planar and is pivotally coupled to the pole for rotating about an axis through the plane of the ring contact.

* * * * *